(12) United States Patent
Petrovic et al.

(10) Patent No.: US 7,926,648 B2
(45) Date of Patent: Apr. 19, 2011

(54) GUIDE(S) MOUNTED ON A CONVEYOR

(75) Inventors: Zmaj Petrovic, Octeville sur Mer (FR);
David Perrin, Octeville sur Mer (FR)

(73) Assignee: Sidel Participation, Octeville sur Mer (FR)

( * ) Notice: Subject to any disclaimer, the term of this patent is extended or adjusted under 35 U.S.C. 154(b) by 0 days.

(21) Appl. No.: 12/669,710

(22) PCT Filed: Jul. 1, 2008

(86) PCT No.: PCT/FR2008/051216
§ 371 (c)(1),
(2), (4) Date: Jan. 19, 2010

(87) PCT Pub. No.: WO2009/019355
PCT Pub. Date: Feb. 12, 2009

(65) Prior Publication Data
US 2010/0206699 A1 Aug. 19, 2010

(30) Foreign Application Priority Data
Jul. 20, 2007 (FR) .................................. 07 05244

(51) Int. Cl.
*B65G 17/00* (2006.01)
(52) U.S. Cl. .................................. 198/836.1; 198/836.3

(58) Field of Classification Search ............... 198/836.1, 198/836.2, 836.3
See application file for complete search history.

(56) References Cited

U.S. PATENT DOCUMENTS

| 1,833,874 | A | * | 11/1931 | Griffith et al. | ............. | 198/688.1 |
| 4,470,499 | A | * | 9/1984 | Sijbrandij | ................... | 198/836.3 |
| 4,502,594 | A | * | 3/1985 | Sijbrandij | ................... | 198/836.3 |
| 5,127,516 | A | * | 7/1992 | Hayashida | ................ | 198/836.1 |
| 6,135,271 | A | * | 10/2000 | Ledingham | ................ | 198/836.3 |
| 6,260,245 | B1 | * | 7/2001 | Marsetti | ...................... | 198/836.3 |
| 6,588,584 | B2 | * | 7/2003 | Craig et al. | ................. | 198/836.1 |
| 7,243,605 | B1 |  | 7/2007 | Belanger et al. |  |  |

FOREIGN PATENT DOCUMENTS

| EP | 0 048 524 A1 | 3/1982 |
| EP | 1 273 536 B1 | 1/2003 |
| FR | 2 715 641 B1 | 8/1995 |
| WO | 03/042075 A1 | 5/2003 |

* cited by examiner

*Primary Examiner* — James R Bidwell
(74) *Attorney, Agent, or Firm* — Sughrue Mion, PLLC

(57) ABSTRACT

The guide (3) of the invention includes two portions: a rail (11) in the form of a relatively rigid metal strip; and a profile (12) made of a thermoplastic material and snap-fitted onto said rail (11), said profile (12) being shaped so as to have a variable section on the entire height thereof for promoting the contact between said guide and the conveyed products at the lower portion of said products. The rail (11) includes a longitudinal rib (13) for stiffening and housing the heads of the screws (14) used for securing the same on the holder (2).

7 Claims, 1 Drawing Sheet

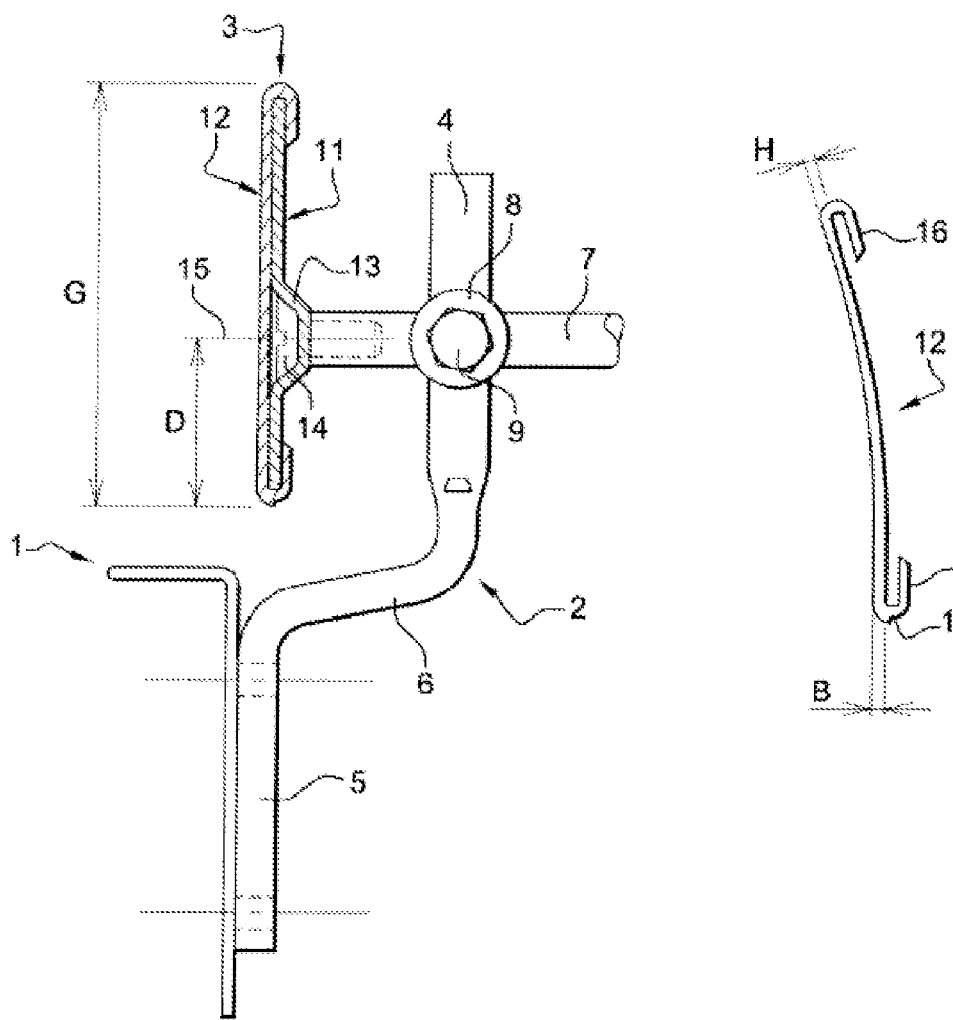
Fig. 1
Fig. 2
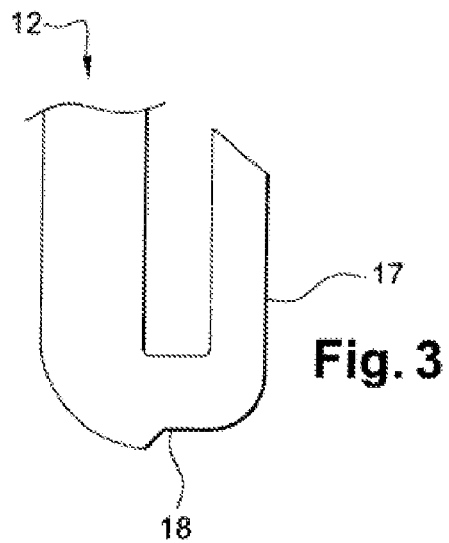
Fig. 3

GUIDE(S) MOUNTED ON A CONVEYOR

CROSS REFERENCE TO RELATED APPLICATIONS

This application is a National Stage of International Application No. PCT/FR2008/051216 filed Jul. 1, 2008, claiming priority based on French Patent Application No. 0705244, filed Jul. 20, 2007, the contents of all of which are incorporated herein by reference in their entirety.

The present invention relates to an improvement in the guide device for products of the bottle or flask type on a conveyor, a conveyor table or others.

In documents FR 2882738 and EP 48524, for example, the conveyor comprises a guide device that comprises guides themselves and holders for these guides, evenly distributed, which holders are secured to the structure of the conveyor.

In a conveyor installation, the guides and guide holders represent a significant part of the equipment. There are numerous parts that are positioned along the conveyors or conveyor tables, on each side.

The conveyed products are frequently in contact with the side guides and this contact can cause alterations, or even damage, to the products and in particular the labels.

The present invention proposes an adjustment to these guides which allows the condition of the products to be better protected during their transport by conveyor by preventing them from rubbing, sometimes with significant pressures, on fragile areas such as the decorated areas holding the label, for example.

The guide according to the invention is constituted by two portions:
- a rail in the form of relatively rigid metal strip that is connected by appropriate means to a holder that itself is firmly secured to the structure of the conveyor,
- a profile made of a thermoplastic material, which is snap-fitted onto said rail, using fasteners in the form of hooks that are arranged above and below said profile, which profile is shaped with a variable section over its entire height, and this variation in section gives it a slight and even slope, from top to bottom, which makes it possible to promote contact between the product and the profile on the lower portion of said product, i.e. in an area where decorative shapes or the label are not applied and which, in general, is the strongest portion of the product.

Moreover, by establishing contact between the guide and the product at a distance that is as short as possible with respect to the conveyor belt, the risks of the occurrence of torque, which tends to destabilize said product, are considerably reduced.

According to another provision of the invention, the thickness of the profile (12) made of a thermoplastic material is of the order of 1 mm for its upper portion and of the order of 3 mm for its lower portion.

This difference in thickness of the profile also makes it possible to always offer the product contact situated on the lower portion of the guide, even if said guide has a tendency to flex due to its cantilevered position.

Even in the event of significant pressure of the product on the guide, the pressure is mainly situated on its lower portion and decreases upwards, which makes it possible, whatever the scenario, to protect the upper portion of the product from any significant alteration.

According to another provision of the invention, the profile is obtained by extrusion with, at the level of its guide surface, a concavity that makes it possible to tighten it onto the rail during the positioning of its securing hooks on said rail.

Still according to the invention, the profile comprises an arrangement of the mistake-proof type, which arrangement is situated on the edge of the lower hook.

According to another provision of the invention, the holder-rail of the profile comprises a longitudinal rib that makes it possible, on the one hand, to stiffen it and, on the other hand, to house the heads of the screws that serve to secure it to the means of support.

This arrangement makes it possible to provide a uniform guide surface, without holes or rough areas, which further reduces the risk of damage and protects the condition of the surface of the products.

Still according to the invention, the longitudinal rib of the holder-rail is situated on the lower portion of said rail so as to increase the inertia of its lower portion and reduce its ability to deform under the pressure of the products.

According to a preferential provision of the invention, the distance between the axis of the longitudinal groove and the lower portion of the guide is comprised, for example, between ⅓ and ¼ of the height of said guide.

The invention will also be described in more detail using the following description and the attached diagrams, given by way of indication, and in which:

FIG. 1 shows, in the form of a cross-sectional elevation, a guide device according to the invention, mounted on the structure of a conveyor, FIG. 2 shows the profile produced from a thermoplastic material, which serves as the friction surface for the guide, FIG. 3 shows the detail, on a larger scale, of the arrangement of the mistake-proof type that allows for the profile to be correctly mounted on the rail that serves as its holder.

As shown in FIG. 1, the guide device is mounted laterally, on the structure (1) of a conveyor or other.

This guide device comprises a holder (2) that is secured to the structure (1) and a guide (3) itself, which guide (3) is firmly secured to said holder (2).

The holder (2) is constituted, for example, by a one-piece metal part made from an appropriate material, preferably a stainless material. This holder (2) is shaped from a cylindrical bar, by any appropriate means such as, for example, a heat stamping operation.

It is of a bayonet-type shape and it comprises two separate portions:
- an upper portion that retains its cylindrical shape and is described as a rod (4) in the remainder of the text,
- a lower portion in the shape of an inverted L with a section that has at least one substantially flat surface, which L-shaped portion comprises a foot (5) that is secured to the structure (1) of the conveyor and a bend (6) that forms the join between said foot (5) and said rod (4). The bend (6) forms an obtuse angle both with the foot (5) and with the rod (4).

The length of the bend (6) makes it possible to offset the rod (4) relative to the foot (5) and to leave sufficient space to house the guide (3) which, in most cases, does not encroach onto the conveyor.

In the embodiment shown in FIG. 1, the guide (3) is held by a cylindrical bar (7), which bar cooperates with a nut (8) that is engaged onto the rod (4) of the holder (2).

The guide (3) is constituted by two pieces:
- a rail (11) in the form of a metal strip that corresponds to the rigid and strong portion of the guide and,
- a profile (12) that covers said rail and acts as a friction surface.

This profile (12) is produced from a thermoplastic material, obtained by appropriate means of the spinning or extrusion type, for example.

The rail (11) is produced from thin sheet metal and comprises a stiffening rib (13) that gives it a certain inertia.

This rib (13) also makes it possible to house the head of the screw (14) that allows for the rail (11) of the guide (3) to be secured on the end of the bar (7). This arrangement allows for a sliding surface to be provided for the guide (3) with no rough areas, which avoids any retention of waste, dirt or other materials, which could contaminate the products transported by the conveyor.

In order to improve the inertia and the rigidity of the active portion of the guide (3), the groove (13) is preferably arranged on the lower portion of said guide. The axis (15) of this groove (13) is situated at a distance D from the lower portion of the guide (3) which is, for example, comprised between ⅓ and ¼ of the height G of said guide.

By way of indication, this type of guide (3) has a height of the order of 10 cm and is at a level, with respect to the conveyor surface, of the order of approximately 1 to 2 cm.

The rail (11) of the guide (3) can also be secured using a clevis mounting, not shown, said clevis mounting being secured in the same way, discretely by bolts, the head of which is countersunk into the rib (13). The mounting of the rail (11) with a clevis mounting offers greater possibilities for adjustment and flexibility as regards its installation on the holder (2).

FIG. 2 shows the cross-section of the profile (12) that acts as the friction surface. This profile has several features that make it possible to improve the structure of the guide (3) and the guiding.

The accuracy of the guiding obtained using the holder (2), in particular, is further improved by the arrangement of the profile (12). The active surface of the profile (12) has a thickness that varies between the top and the bottom of the guide (3); the thickness H in the upper portion of the profile (12) is less than the thickness B of this same profile in the lower portion of said profile.

This thickness can vary from H=1 mm at the top of the profile (12) to B=3 mm at the bottom of said profile (12), for example. This difference makes it possible to correctly carry out the guiding of the products while limiting as far as possible the contact area between these products and the profile (12) of the guide (3). Moreover, the guiding takes place on the lower portion of the products, i.e. in an area which, generally, is less fragile than the area holding the label, for example, where products of the bottle or flask type are concerned.

The profile (12) comprises fittings in the form of hooks on its upper portion and its lower portion.

These hooks (16) and (17) make it possible to snap-fit this profile (12) onto the rail (11) and its grip on the latter is reinforced almost naturally by the shape that is given to the friction surface of this profile (12) when it is manufactured.

The friction surface of the profile (12) is in fact shaped with a concave curvature, as shown in FIG. 2, which makes it possible to press the central portion of said surface onto the rail (11) and to make said profile (12) grip the latter.

In order to help the operator to install the profile (12) correctly during its mounting on the rail (11), a nick is made on its lower portion, on the edge of the hook (17), as shown in FIG. 3.

This nick acts a mistake-proof device; it is made under the hook (17) and it consists of a recess (18) that forms a groove over the length of the profile (12).

The invention claimed is:

1. A guide for a conveyor of products of the bottle or flask type, the guide being of the type comprising two portions:
   a rail in the form of a relatively rigid metal strip that is connected by connecting means, of the support bar type, to a structure of said conveyor,
   a profile, made of a thermoplastic material, which is snap-fitted onto said rail, using fastenings in the form of hooks that are arranged above and below said profile,
   wherein said profile is shaped with a variable section over the entire height of said profile, which variation in section gives said profile a slight slope from top to bottom in order to promote contact between the products and said profile on a lower portion of the products.

2. The guide according to claim 1, wherein said profile made of a thermoplastic material has a thickness which is of the order of 1 mm in an upper portion of said profile and of the order of 3 mm in a lower portion of said profile.

3. The guide according to claim 1, wherein said profile is obtained by extrusion with, at the level of a guide surface of said profile, a concavity that makes it possible to tighten said profile onto said rail during the positioning of said hooks on said rail.

4. The guide according to claim 2, wherein said profile comprises an arrangement in the form of a groove acting as a mistake-proof device, which arrangement is produced on a lower hook of said profile.

5. The guide according to claim 1, wherein said rail comprises a longitudinal rib that makes it possible, on the one hand, to stiffen said rail and, on the other hand, to house heads of screws that serve to secure said rail to support bars.

6. The guide according to claim 5, comprising a longitudinal groove on said rail that is situated on a lower portion of said rail so as to increase the inertia of said lower portion and to reduce the ability of said lower position to deform under the pressure of products.

7. The guide according to claim 6, wherein the distance between an axis of said longitudinal groove and said lower portion of said guide is comprised, between ⅓ and ¼ of the height of said guide.

* * * * *